United States Patent
Oh et al.

(10) Patent No.: US 7,970,419 B2
(45) Date of Patent: Jun. 28, 2011

(54) SYSTEMS, DEVICES AND METHODS FOR LOCATION DETERMINATION

(75) Inventors: Seung June Oh, Santa Monica, CA (US); Eugene Koh, Brookline, MA (US); Hyewon Kim, Glendale, CA (US)

(73) Assignee: Virgin Mobile USA L.L.C., Warren, NJ (US)

( * ) Notice: Subject to any disclaimer, the term of this patent is extended or adjusted under 35 U.S.C. 154(b) by 964 days.

(21) Appl. No.: 11/893,487

(22) Filed: Aug. 16, 2007

(65) Prior Publication Data

US 2009/0047979 A1 Feb. 19, 2009

(51) Int. Cl.
*H04W 24/00* (2009.01)

(52) U.S. Cl. .................. 455/457; 455/456.5

(58) Field of Classification Search ........... 455/404.2, 455/456.1–457, 552.1
See application file for complete search history.

(56) References Cited

U.S. PATENT DOCUMENTS

| | | | |
|---|---|---|---|
| 6,289,280 B1 | 9/2001 | Fernandez-Corbaton et al. | 701/214 |
| 6,449,486 B1 * | 9/2002 | Rao | 455/456.1 |
| 6,556,832 B1 | 4/2003 | Soliman | 455/456 |
| 6,710,740 B2 | 3/2004 | Needham | 342/357.13 |
| 6,912,395 B2 | 6/2005 | Benes et al. | 455/456.1 |
| 6,961,543 B2 | 11/2005 | Hunzinger | 455/67.11 |
| 6,988,026 B2 | 1/2006 | Breed et al. | 701/29 |
| 7,123,188 B2 | 10/2006 | Needham | 342/357.13 |
| 7,262,731 B2 | 8/2007 | Han | 342/357.02 |
| 2005/0250516 A1 * | 11/2005 | Shim | 455/456.1 |
| 2005/0255866 A1 * | 11/2005 | Dupuy et al. | 455/456.6 |
| 2006/0250302 A1 * | 11/2006 | Park et al. | 342/357.1 |

* cited by examiner

*Primary Examiner* — Michael T Thier

(57) ABSTRACT

A method and system for location determination of a multimode device using a plurality of GPS fixation processes, each fixation process using a different mode (e.g. Cell-ID, MS-Assist, and MS-based) of the device is provided. The invention relates to methods for quickly obtaining and displaying geographic location of a mobile device on its display. These methods can be performed by applying successive fixation steps as outline herein.

18 Claims, 9 Drawing Sheets

SYSTEMS, DEVICES AND METHODS FOR LOCATION DETERMINATION

FIELD OF THE INVENTION

The invention relates to the field of location determination using electronic devices. Specifically, the invention relates to systems, devices, and methods for location determination and display using a mobile device adapted to communicate with multiple networks and/or multiple location determination services.

BACKGROUND OF THE INVENTION

The Global Positioning System ("GPS") is currently the most well-known location information service system. GPS uses a satellite network to transmit signals to individual GPS receivers on the ground which then calculates receiver positions based on these signals. As the popularity of GPS has grown, GPS receivers have been integrated as components in many different types of multi-functional devices such as in personal mobile devices, such as cellular phones, to allow users to instantaneously determine their locations and obtain directions. In addition to GPS, Wi-Fi (IEEE 802.11) based location determining services using software-only positioning systems have been developed in recent years. Software-only positioning systems leverage a nationwide database of known Wi-Fi access points to calculate the location of any Wi-Fi enabled device.

The present invention provides systems, devices, and methods that utilize a combination of different location determination technologies and systems for expedited location determination using dual-mode and multi-mode mobile devices.

SUMMARY OF THE INVENTION

In one aspect, the invention relates to a method of generating a number of location datasets for a mobile device. The method includes the steps of obtaining a first set of location data from a first source such that the first set of location data has a first level of granularity, obtaining a second set of location data from a second source such that the second set of location data has a second level of granularity, obtaining a third set of location data from at least one of the second source and a third source such that the third set of location data has the second level of granularity, and displaying location information to the user generated in response to at least one of the first, second and third sets of location data.

In one embodiment of this aspect of the invention, the first level of granularity is coarser than the second level of granularity. In another embodiment, the first level of granularity can be cell tower location based information. The second level of granularity can be global positioning satellite based information.

In another aspect, the invention relates to a method of determining the location of a mobile device such that the mobile device is adapted to communicate with a location service network using a plurality of modes for generating location data. The method includes the steps of transmitting a plurality of requests for location data to the location service network, and sequentially receiving a plurality of responses containing location data from the location service network such that each response generated in response to each of the plurality of requests, and each of the responses from the location data provider is generated using a different mode of the plurality of modes.

One embodiment of this aspect of the invention includes a Global Positioning System and a cellular network. In an embodiment, one of the modes can be a Cell ID mode, a MS-based mode or a MS-Assist mode. In another embodiment, the location data can be chosen from latitude data, longitude data or altitude data. In yet another embodiment, this method can include relaying the location data to an application on the mobile device. In a further embodiment, one of the modes is adapted to provide continuous tracking of the mobile device.

In a further embodiment of the invention, the method includes displaying the location data from each of the plurality of responses sequentially in the order that the corresponding response is received. The location data from each of the plurality of responses corresponds to a different zoom level on a map displaying the location of the mobile device.

Another aspect of the invention is to provide a method for determining the location of a mobile device, in which, the mobile device has a plurality of modes for obtaining location data, and at least two of the modes have a different response time. The method includes the steps of generating a ranking of the plurality of modes based on their response times; and sequentially obtaining location data using each of the plurality of modes in the order of the ranking. In one embodiment, at least one of the modes uses GPS data for obtaining location data. In another embodiment, at least one of modes uses cellular network data. The modes can be a Cell ID mode, a MS-based mode, or a MS-Assist mode.

In another embodiment, the location data can be chosen from latitude data, longitude data or altitude data. In a further embodiment, the step of generating a ranking can be performed using a Java application resident on the mobile device. In yet another embodiment, the method further includes the step of sequentially displaying the location data obtained using the plurality of modes in the order of the ranking.

Another aspect of the invention is a method of determining the location of a mobile device, in which the mobile device has a plurality of modes for obtaining location data. Such a method includes the steps of obtaining a first set of location data using a first mode of the plurality of modes, in which the first set of location data represents a first estimate of the location of the mobile device, and subsequently obtaining a second set of location data using a second mode of the plurality of modes, in which the second set of location data represents a second estimate of the location of the mobile device. The first estimate includes a larger geographic region relative to the second estimate, and the first set of location data requires less time to obtain than the second set of location data.

In yet another aspect of the invention, a method for a mobile device having a plurality of modes for obtaining location data to display a map on the mobile device to indicate the location of the mobile device at multiple zoom levels is presented. The method includes the steps of obtaining a first set of location data corresponding to a first zoom level relative to the location of the mobile device on the map using a first mode of the plurality of modes; and obtaining a second set of location data corresponding to a second zoom level relative to the location of the mobile device on the map using a second mode of the plurality of modes.

In one embodiment of this aspect of the invention, the method further includes displaying the location of the mobile device on the map at the first zoom level; and displaying the location of the mobile device on the map at the second zoom level. In another embodiment, in response to a user action, the location of the mobile device on the map at the second zoom level is displayed. In a further embodiment, the second zoom level provides a more accurate location of the mobile device. In yet another embodiment, obtaining the second set of location data requires more time than obtaining the first set of location data.

In a further aspect of the invention relates to a method of determining and displaying mobile device location. The method includes performing a first fixation process using a first mode that generates a first location data having a first granularity; performing a second fixation process using a second mode that generates a second location data having a second granularity; and displaying the second location data on the mobile device.

In an embodiment of this aspect of the invention, the first and the second fixation processes include the steps of selecting a location service from a plurality of location services, transmitting a request for location data, receiving location data from the location service, and relaying location data to an application on a mobile device.

In another embodiment, the first and the second modes are chosen from Cell-ID, MS-Assist or MS-Based. In yet another embodiment, the method includes performing a third fixation process using a third mode that generates a third location data having a third granularity.

The methods are explained through the following description, drawings, and claims.

BRIEF DESCRIPTION OF THE DRAWINGS

These embodiments and other aspects of this invention will be readily apparent from the detailed description below and the appended drawings, which are meant to illustrate and not to limit the invention, and in which.

DETAILED DESCRIPTION OF THE PREFERRED EMBODIMENTS

Figure 1A:
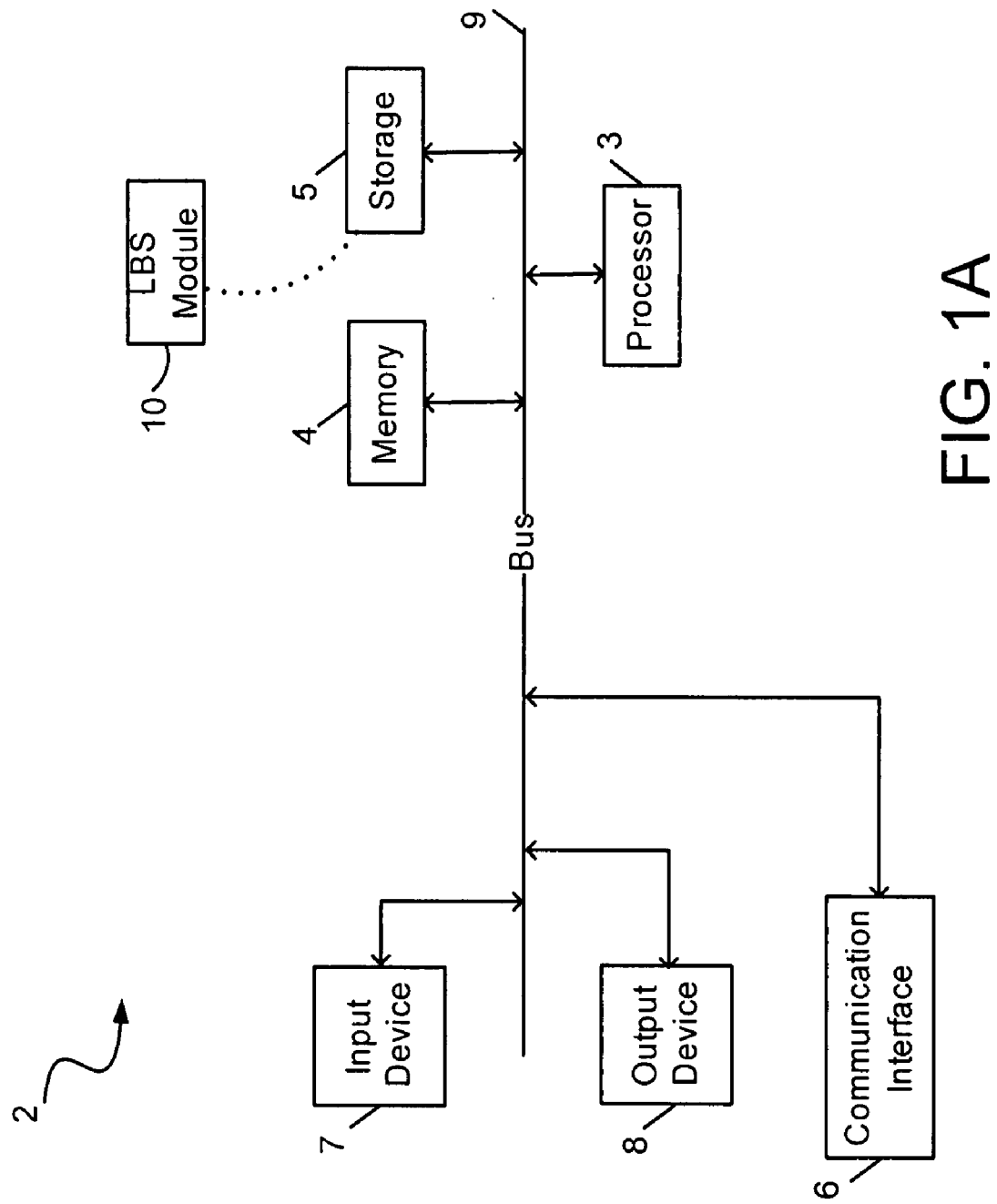
FIG. 1A is a functional block diagram that illustrates the components of an exemplary system that includes multi-mode location determining network interface components for practicing an embodiment of the present invention.

The present invention will be more completely understood through the following detailed description, which should be read in conjunction with the attached drawings. In this description, like numbers refer to similar elements within various embodiments of the present invention. Within this detailed description, the claimed invention will be explained with respect to preferred embodiments. However, the skilled artisan will readily appreciate that the methods and systems described herein are merely exemplary and that variations can be made without departing from the spirit and scope of the invention.

Embodiments of the invention use various location determination technologies. Suitable location determination technologies includes, but are not limited to Cell-ID, Mobile Station Based Method (MS-Based) and Mobile Station Assisted Positioning Mode (MS-Assist). Each technology has its own advantages. Cell-ID estimates the location of a mobile device by relating a cell ID of a cell tower to geo-coordinates recorded with a GPS device. Typically, Cell-ID operates with a granularity that is too coarse to predict device location with a high accuracy, but the computation is fast and identifying device position relative to a given cell tower is sufficient for many applications.

When compared to Cell-ID, MS-Assist and MS-Based provide slower but more precise location data by communicating between the mobile device or mobile station and a position determination entity (PDE). Because response time for MS-Assist is in seconds, it has been used for a single fix application such as in geographic information systems (GIS) data lookup. In contrast, response time for MS-Based is in milliseconds. Thus, it has been used in multi-fix applications such as tracking and turn-by-turn navigation. Presently, none of these methods have been applied in sequence to minimize response time for location determination. To optimize location determining response time and accuracy of dual-mode or multi-mode mobile devices, the aspects of the embodiments disclosed herein use a combination of position determining processes to substantially reduce the amount of time needed to calculate and display locations. In turn, this enhances the user experience and the integration of their mobile device in all facets of their lives.

Embodiments of the present invention relate to methods and systems for determining and displaying a location of a wireless multi-mode device using a plurality of GPS fixation processes, each process using a different mode of the device. Geographic information in coarse granularity is first calculated and displayed such that one or more subsequently more accurate fixation processes are employed to determine the geographic location to be displayed in finer granularity. The systems disclosed herein deliver better and faster location detection service than the traditional GPS. This is achieved by allowing users to obtain a quick initial location fix at a first more general geographic level using a first fixation mode, having a short response time, and then apply successive fixation modes to enhance the accuracy of the positional information. While the subsequent modes are running, the initial level of geographic information is displayed to the user to mask the time delay.

In the following discussion of illustrative embodiments, a "mobile device" includes, without limitation, mobile phones, remote control devices, personal digital assistants, hand-held computers, ultra-mobile personal computers, and the like. Embodiments of the present invention relate to systems and methods for providing location determination features to a user that are fast, reliable, and consistently available. Since some GPS fixation methods have a faster response time, and some have better accuracy in calculating the location of the mobile device, employing a combination of different fixation methods benefits the device users. Specifically, it allows for maximizing the accuracy of the location determination in the shortest amount of time while displaying interim levels of geographic information to mask time delay for multiple location based services, such as, for example, GPS, Wi-Fi, and cellular. In the event that one or more location based services ("LBS") or their associated networks are not available or if one is better for a particular purpose, the techniques disclosed herein can be applied to select a given LBS, network, or location determining process to enhance the user's experience with the mobile device.

FIG. 1A is a functional block diagram that illustrates the components of an exemplary mobile device 2 for practicing an embodiment of the present invention. Mobile device 2 preferably includes a processing unit or processor 3, a system memory 4, a disk storage 5, a communication interface 6, an input device 7, an output device 8, and a system bus 9. System bus 9 couples system components including, but not limited to, system memory 4 to processing unit 3. The processing unit 3 can be any of various available processors. A location based systems module (LBS) 10 is also shown. The LBS module 10 can include various data elements and programs suitable for performing the process steps and calculations outlined below with respect to the sequential processing of two or more fixation processes. Suitable fixation processes include, but are not limited to Cell-ID, MS-Assist, and MS-Based.

Input device 7 may be a keyboard, thumbboard, or touch-screen (for use with a stylus) that are used to receive data from a user. In addition, input device 7 can also include a plurality of other inputs or controls for adjusting and configuring one or more aspects of the present invention including voice commands. Output device 8 may be a display device, such as an LCD or LED display screen, that can display one or more display objects (not shown) such as configurable icons, buttons, input boxes, menus, tabs, key labels and so forth having multiple configurable dimensions, shapes, colors, text, data and sounds to facilitate operations with mobile device 2.

Communication interface 6 facilitates data exchange over a variety of wireless networks. As shown, the communication interface 6 can include a plurality of components or operational features that allow the communication device to select between a plurality of location services as outlined below. For example, communication interface may correspond to a cellular LBS module, while components other components of the interface (not shown) may correspond to Wi-Fi LBS and traditional GPS or enhanced GPS modules, respectively. The hardware and software necessary for connection to the communication interface 6 includes, for exemplary purposes only, internal and external components that transmit and receive data wirelessly using a plurality of standard protocols including, for example, GSM, CDMA, W-CDMA, Bluetooth, Wi-Fi, IrDA, WiMAX, WiBRO or through other known wireless standards.

Storage 5 may include removable or fixed, volatile or nonvolatile or permanent or re-writable computer storage media. The computer readable medium can be any available medium that can be accessed by a general purpose or special purpose mobile device. By way of example, and not limitation, such a computer readable medium can comprise flash memory, RAM, ROM, electrically erasable programmable read only memory (EEPROM), optical disk storage, magnetic disk storage or other magnetic storage devices, or any other medium that can be used to store digital information on a mobile device.

It is to be appreciated that FIG. 1A describes software that acts as an intermediary between users and the basic resources described in mobile device 2. Such software preferably includes an operating system. The operating system, which can be resident in storage 5, acts to control and allocate resources of mobile device 2. System applications take advantage of the management of resources by the operating system through program modules and program data stored either in system memory 4 or on disk storage 5. Furthermore, it is to be appreciated that the present invention can be implemented with various operating systems or combinations of operating systems. The methods of applying a plurality of GPS fixation processes, each fixation process using a different mode of the device such that displaying an initial display of geographic information in coarse granularity during computation of subsequent fixation processes can be implemented in software resident in memory that interacts with the communication interface and processor and/or other device components as appropriate. The LBS module 10 or other components of a mobile device can be used to implement this position determining process.

The computer readable medium tangibly embodies a program, functions, and/or instructions that cause the computer system to operate in a specific and predefined manner as described herein. Those skilled in the art will appreciate, however, that the process described below relating to location detection using selective service connection, detection, and ranking, as well as other features recited herein, may be implemented at any level, ranging from hardware to application software and in any appropriate physical location. For example, the present invention may be implemented as software code to be executed by mobile device using any suitable computer language and may be stored on any of the storage media described above, or can be configured into the logic of mobile device 2. Such software code may be executed by mobile device using any suitable computer language such as, for example, Java, Javascript, C++, C, C#, Perl, Visual Basic, Transact/Structure Query Language (T/SQL), database languages, APIs, various system-level SDKs, assembly, firmware, microcode, and/or other languages and tools.

These are representative components of a mobile device whose operation is well understood. Furthermore, those of ordinary skill in the art will appreciate that mobile device 2 of FIG. 1A is exemplary only and that the present invention can operate within a number of different mobile devices.

Figure 1B:
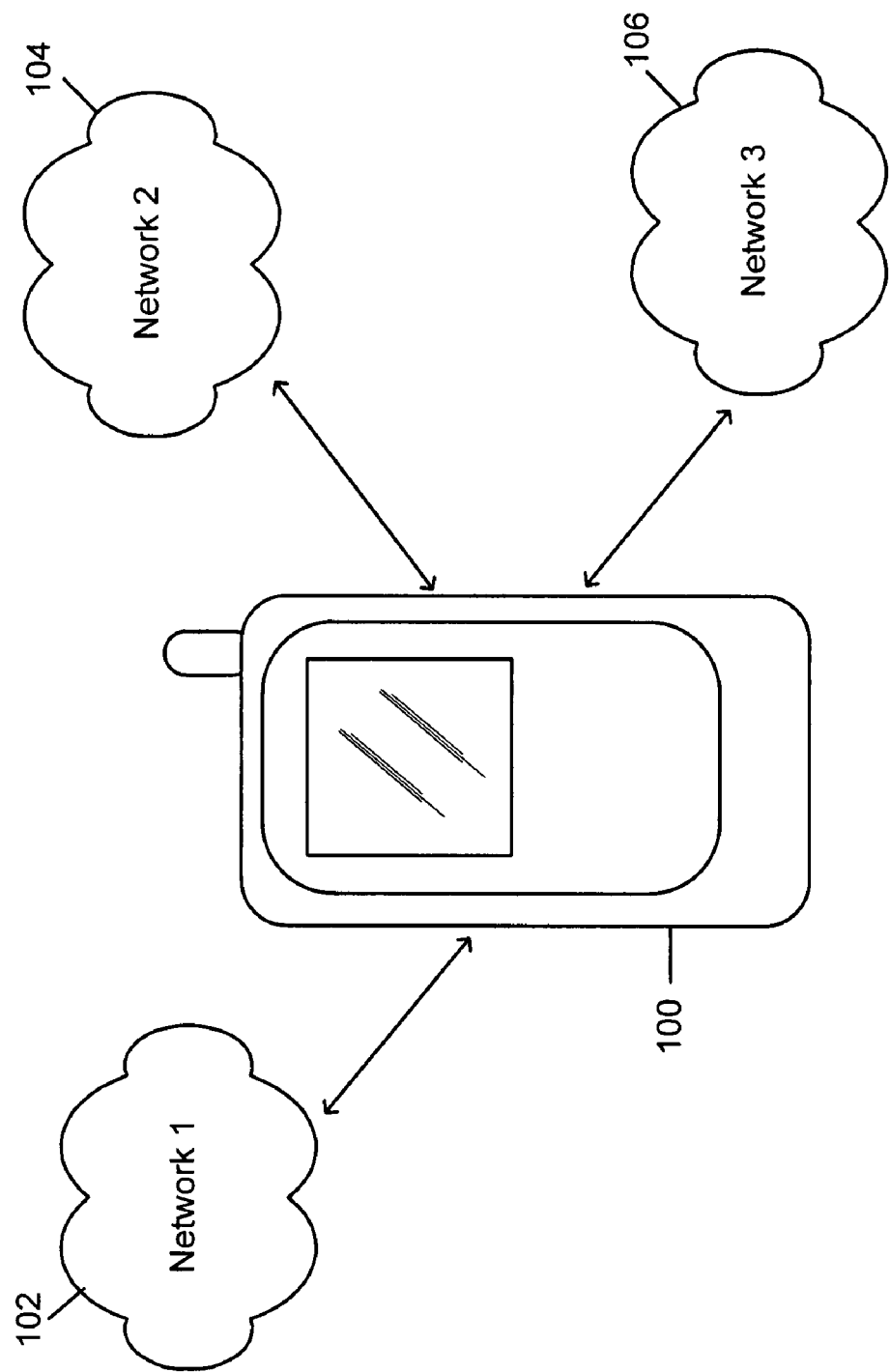
FIG. 1B is a diagram illustrating a system for determining the location of a mobile device using multiple location services and associated networks, according to an embodiment of the invention.

FIG. 1B illustrates the components of an exemplary mobile device 100 for practicing an embodiment of the present invention. In the illustrated embodiment, the mobile device preferably includes a display, a processor, a keypad, and one or more network interface components adapted to access a plurality of location determination services associated with multiple networks using a network interface/communication interface.

Specifically, FIG. 1B illustrates a mobile device 100 in communication with multiple networks 102, 104, 106. Each of the three networks shown is associated with at least one LBS. In various embodiments, the mobile device 100 may be a mobile phone (as illustrated), personal digital assistants, hand-held computers, ultra-mobile personal computers, and the like. The mobile device includes a communication subsystem adapted to communicate with the multiple networks 102, 104, and 106. An example of such a device is a dual mode 802.11/cellular phone, which is capable of receiving Wi-Fi signals in addition to the basic cellular network signals.

Given the geographic placement of Wi-Fi hotspots and the cells associated with different towers and base stations used for cellular phone service, both cellular services and Wi-Fi services can be used as location determination services in accordance with the teachings described herein. Thus, a mobile device with GPS, Wi-Fi, and cellular capabilities can act as a multi-mode location determining device. However, the term dual mode or multi-mode is not limited to a particular grouping of networks or service types. Thus, multi-mode can refer to the ability of the mobile device to access two or more location determination services such as a LBS and/or their associated location data providing services.

Each of the networks 102, 104, 106 provides a location service that allows the user of the mobile device 100 to determine his or her current location and calculate directions to specified destinations. The networks 102, 104, 106 each utilize different Open Systems Interconnection (OSI) Layer 1 and Layer 2 technologies. For example, network 1 102 may be an IEEE 802.11 Wi-Fi network, network 2 104 may be a cellular network that utilizes the devices position to different cells to generate positional information, or it may be an enhanced service that combines cellular data with GPS data to provide location service, and network 3 106 may be a IEEE 802.16e WiMAX network. The location information may come from any of the networks based on the availability of the networks and preprogrammed fallback logics that are designed to optimize the location service.

When the device 100 is within a particular range of some or all of the networks 102, 104 and 106, the device 100 is programmed to automatically select a network based on a predetermined ranking of the networks or another LBS criteria. The LBS criteria can be a function of the particular software application that is collecting the location data on the device 100. Because the networks 102, 104, 106 are based on different technologies, each has its own advantages over the others. For example, the Wi-Fi network 102 based location service is more accurate and less expensive than the other service, but the wireless network based service may be more ubiquitous than the Wi-Fi based service. The mobile device 100 may also provide the option of allowing the user to set a default location service and manually switch to a different one when necessary. Network selection and fallback logics will be further discussed below.

As mentioned above, to communicate with the different networks 102, 104, 106, the mobile device 100 can be a multi-mode device configured with multiple network interfaces, one for communicating with each location service network. This is because that the networks 102, 104, 106 are built based on different standards and have different protocols. Consequently, a device 100 capable of communicating with the networks 102, 104, 106 has to be able to switch between the different modes to transmit data in the format compatible with a particular network. One existing multi-mode device is the aforementioned dual-mode 802.11/cellular phone. A typical dual-mode 802.11/cellular phone has most of the common features of a cell phone, including one or more keypads, at least one screen, a speaker, a microphone and an antenna. What distinguishes the dual-mode phone from an ordinary phone are the additional components it has which allow it to switch between different networks when in use. In one embodiment, the present invention utilizes the mode-switching capability of such dual-mode devices for the purpose of obtaining location data. Generally, the aspects and embodiments described herein are extendible to any multi-mode device that can (1) switch between networks in response to processor and software instructions and (2) collect location data from an LBS.

Figure 2:
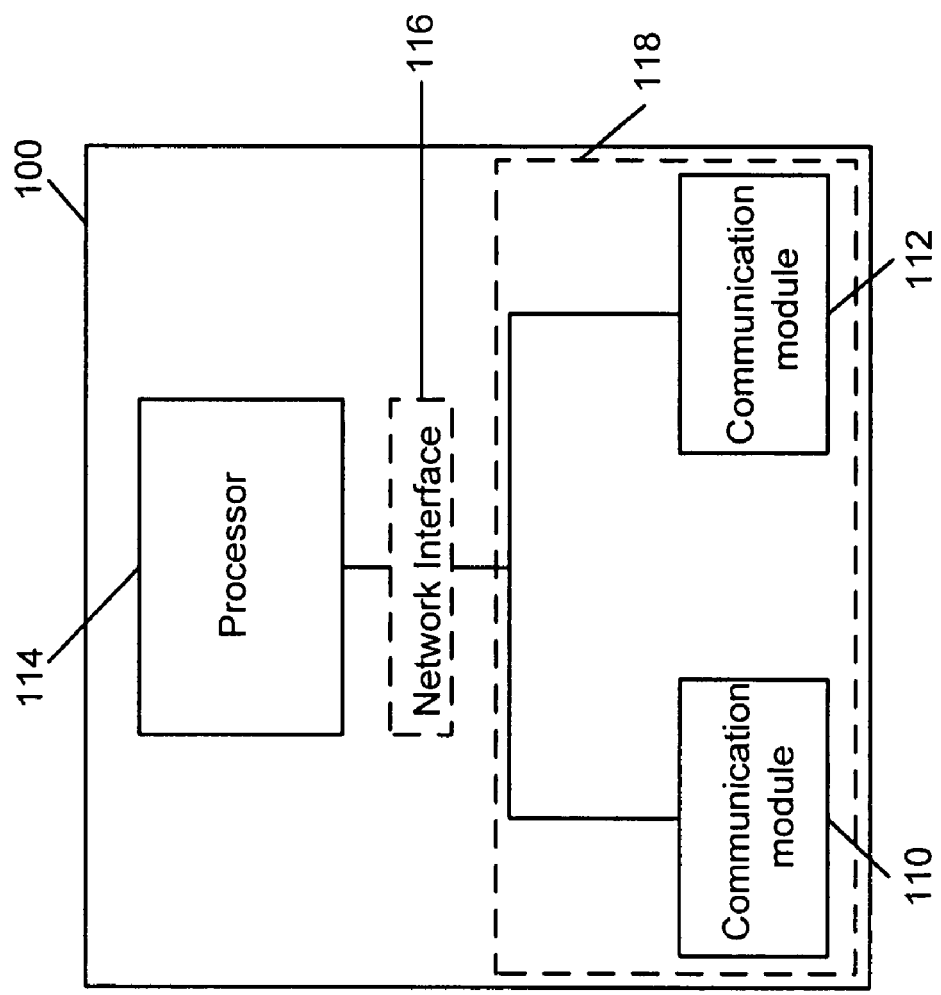
FIG. 2 is a diagram illustrating the components of a mobile device which may be used to obtain location information, according to an embodiment of the invention.

FIG. 2 illustrates components of an exemplary device 100, such as a dual-mode wireless device, suitable for retrieving location data from different networks, according to one embodiment of the invention. Referring to FIG. 2, the device 100 includes a processor 114, an optional network interface component 116 and a communication subsystem 118. In one embodiment, the network interface component can be part of, or comprise the entire subsystem 118. The processor 114 processes a user request for location service, selects a network from substantially all compatible networks, and forwards the request to the selected network. The network interface component 116 serves as a gateway between the processor 114 and the communication subsystem 118. The network interface component 116 can convert the request into the correct data format compatible with the network selected by the processor 114 and for passing the formatted request to the corresponding communication subsystem 118.

Within the device embodiment depicted in FIG. 2, the communication subsystem 118 may further include two communication modules 110, 112, each configured to send and receive information from and to its corresponding network. In some embodiments, additional communication modules can be used for a multi-mode device. For example, when the 802.11 Wi-Fi network is selected by the processor, the request for location service data is passed to the first communication module 110. The first communication module 110 then searches for an available Wi-Fi location service network in the area. These two module 110, 112 can be implemented as software resident in memory in some embodiments. If one is found, the first communication module 110 transmits the request to the Wi-Fi network and receives the location data back from the Wi-Fi based location service. The location data may be in the format of latitude, longitude and altitude coordinates, or in any format that can be processed by the processor 114 of the device 100. The different communication subsystems also monitor the active network or active LBS service to determine if a switch to a new network is required.

In this example, if no Wi-Fi network is detected by the first communication module 110 in a limited time period, the first communication module 110 reports the timeout event to the processor 114 which then resends the request to the second communication module 112. The second communication module 112 then initiates a search for a cellular signal from a cellular network which provides GPS based location service or another cellular based LBS. If the cellular network is available, the request is transmitted by the second communication module 112 via the cellular network to obtain the generated location coordinates. The coordinates are transmitted back to the second communication module 112 via the cellular network. Similarly, the second communication module 112 then forwards the location data back to the processor 114. In various devices, the communication modules 110, 112 may be hardware components such as application-specific integrated circuits, or implemented by software applications or libraries stored in the memory (not shown) of the device 100. Alternatively, the first communication module can first initiate a Cell-ID data request while the second module is initiate a MS-Assist or MS-Based approach.

The location data is first converted by the network interface component 116 to a format recognizable by the processor 114. The processor 114, upon receiving the data, may either format the data for displaying on the screen of the cellular device 100 or send it to various applications stored in the memory, for example, to generate precise location or turn-by-turn direction by applying one or more successive location determination algorithms.

The network interface component 116 employs a variety of GPS-based, cellular and Wi-Fi based location determination technologies and systems in conjunction with the existing cellular location determination technologies. Location determination technologies include, but are not limited to, Cell-ID, Mobile Station Based Method (MS-Based) and Mobile Station Assisted Positioning Mode (MS-Assist).

Figure 3:
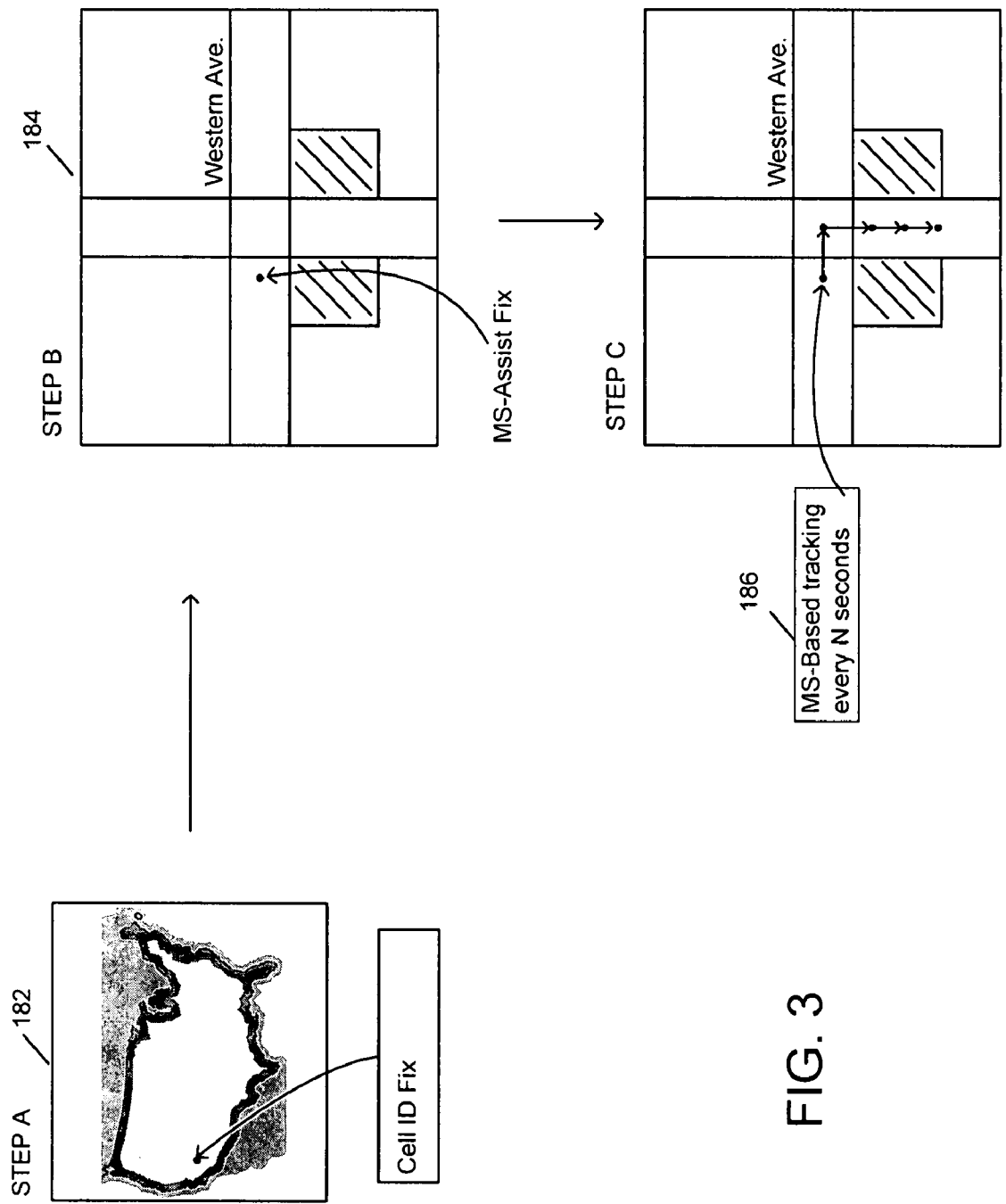
FIG. 3 is a high level flow diagram that illustrates the steps of using a mobile device to obtain location information, according to an embodiment of the invention.

FIG. 3 is a flow diagram illustrating the steps of a method of obtaining location information using a mobile device according to an embodiment of the invention. In operation, a user of a multi-mode mobile device makes a request for their current location, either by a voice command or by selecting an option from a menu on the display of the device. As illustrated, the multi-mode wireless device applies a first fixation process to locate the geographic location of the mobile device 100 (Step A). While the first fixation process is performed, during the response time, a U.S. map 182 is displayed initially on the screen of the mobile device 100. In one embodiment, this first fixation process is Cell-ID, which has a short response time but is suited for computing a coarse level of geographic information.

The granularity of the location map is measured by the amount of details in a location map. Upon the application of the first fixation process using Cell-ID, only city level information is obtained. The corresponding location map only provides which city the mobile device is located, and thus the granularity is coarse. The location data resulting from the fixation processes may be stored in the memory of the device or dynamically updated by a remote wireless network server.

In one embodiment, after obtaining and displaying the initial city level location information on the screen, a second fixation process is performed (Step B), in which a street level map 184 is displayed. However, two or more fixation processes can be initiated at the same time such that they run in parallel. The resulting granularity in the location data becomes more refined. In this embodiment, MS-Assist is applied. The MS-Assist fixation process works in both indoor and outdoor conditions. The resulting location, with finer granularity, is displayed on the street level map 184 on the screen of the mobile device 100. Alternatively, as shown below, MS-Based tracking can be used as the second or third fixation process in this illustrative embodiment, in which MS-Based tracking sends signals to the PDE approximately every six seconds (or other periodic interval, such as N seconds) (Step C) to update any changes in geographic location. However, a MS-Based method is typically only used in an outdoor environment.

In a further embodiment, a third fixation process using MS-Based tracking can be used to track the moving mobile device 100 at approximately every six seconds (or other periodic interval) and updates the display with tracking information 186. In one embodiment, when using MS-Based mode, the device 100 calculates a location fix based on network provided satellite information. As a result, using this mode, the location determining process is enhanced when performed outside.

Figure 4:
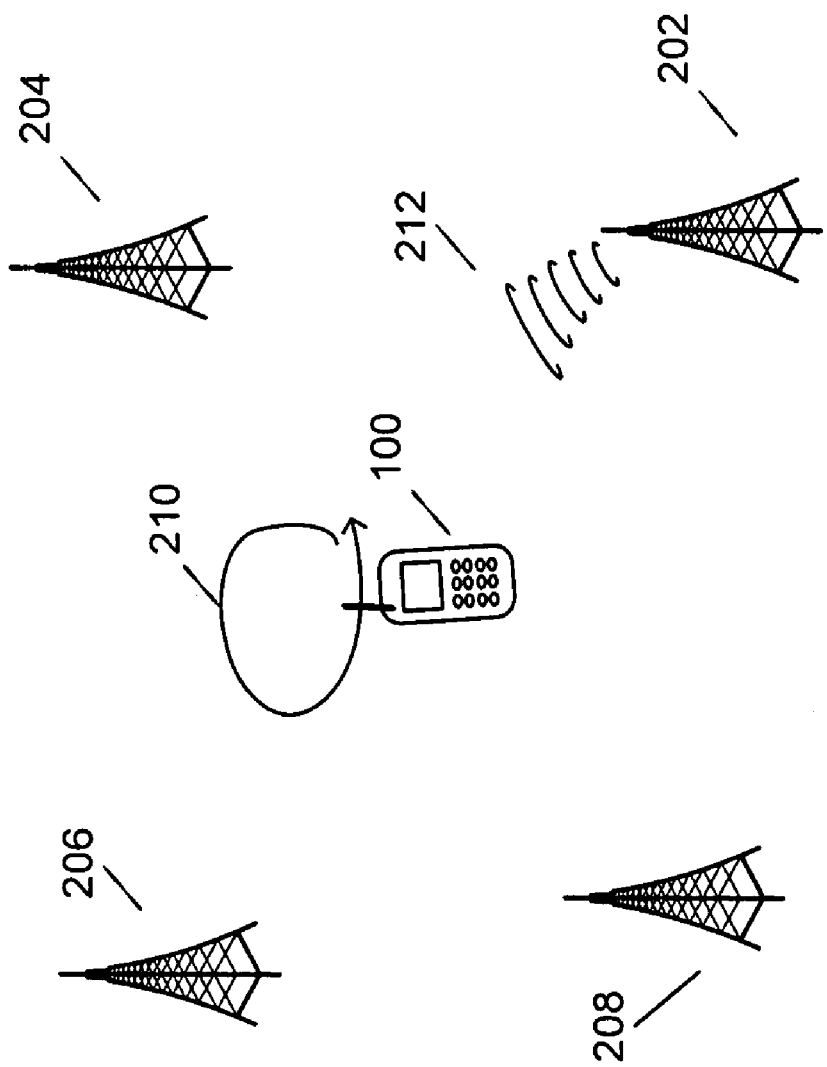
FIG. 4 is a flow diagram that illustrates Cell-ID location determination logic, according to an embodiment of the invention.

As illustrated in FIG. 4, Cell-ID technology is based on obtaining location information from the nearest cell tower 202 to determine the location of the mobile device 100. It is a process in which the device location is tracked through cell tower locations. Typically, a mobile device 100 searches for cell towers 202, 204, 206 and 208 around its area. The communication subsystem 118 sends a signal 210 to alert a cellular tower 202 (often to the nearest cellular tower) that the device 100 is in the cell served by that tower 202. The cellular tower 202, in turn, sends a signal 212 to the device's communication system 118 to notify the wireless device 100 that it is in the cell corresponding to that cellular tower 202. The wireless device 100 picks up the strongest and least traffic cell tower 202. In connecting to that cell tower 202, cell tower 202 sends its own location in latitude and longitude. From this information, location information can be determined approximately where the wireless device is located. Thus, in one embodiment, the level of granularity associated with at least a portion of the location determination process described herein can range from one to multiple cells.

Figure 5:
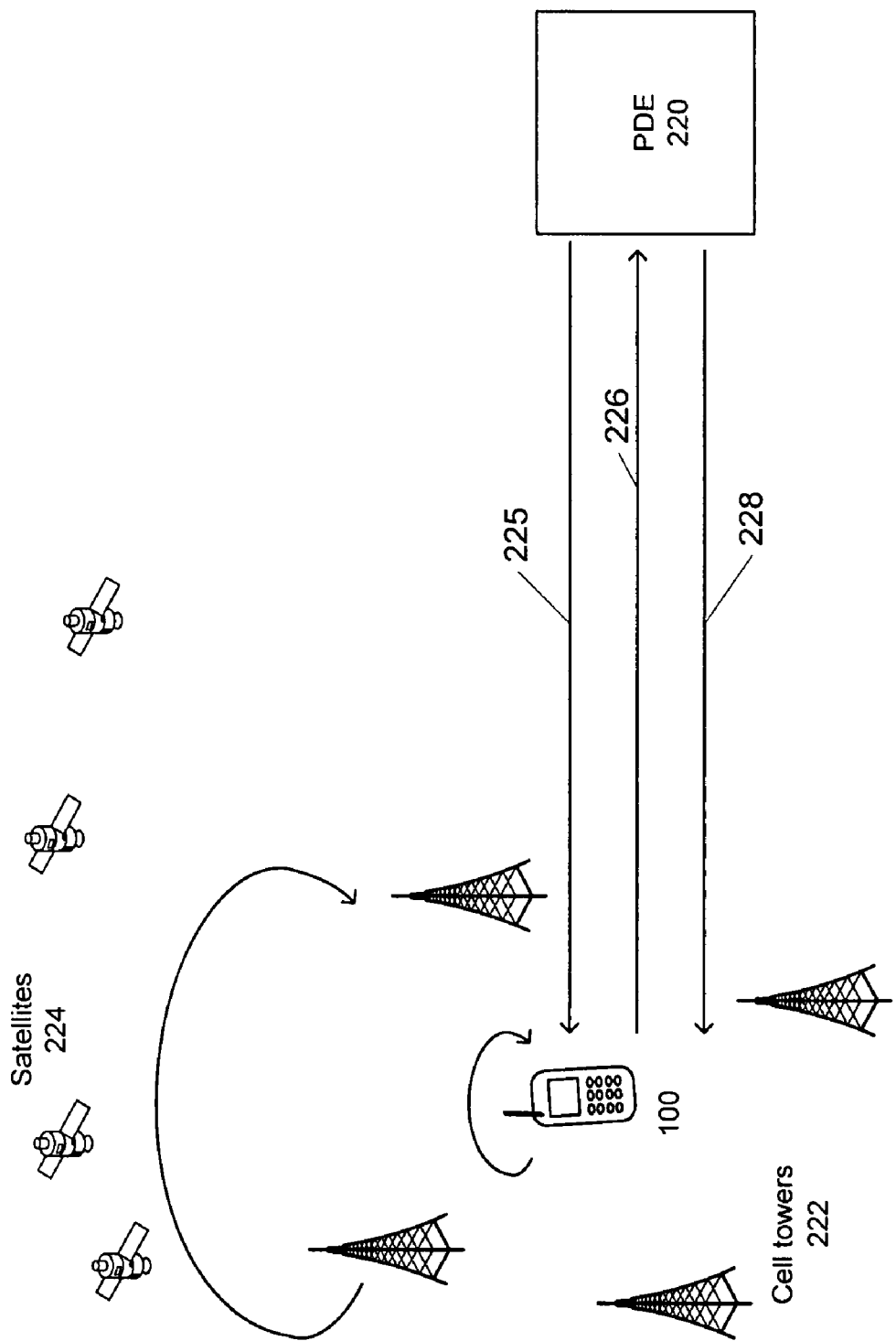
FIG. 5 is a flow diagram that illustrates MS-Assist location determination logic, according to an embodiment of the invention.

A MS-Assist based method is illustrated in FIG. 5, and uses GPS-aiding servers such as a Position Determining Entity ("PDE") 220 to (1) track cell tower(s) 222 and satellite 224 information and/or (2) send location information to the mobile device 100. A PDE 220 is a system resource (e.g. a server) typically within a network, working in conjunction with one or more GPS reference receivers, which is capable of exchanging GPS related information with the cellular network. The location information is calculated inside the cellular network. PDE 220 provides GPS-aiding information 225 to the mobile device 100. Using the GPS-aiding information, the device 100 searches for satellites 224 and cell towers 222. The mobile device 100 sends the searched location 226 of satellites 224 and cell towers 222 to the PDE 220. The PDE 220 may compute the geographic location of the mobile device 100 from a plurality of (such as four or more) of the range measurements and send the geographic information 228 back to the mobile device 100. MS-Assist is suitable for one-time or "one-shot" fixes wherein the location does not need to be updated frequently.

Figure 6:
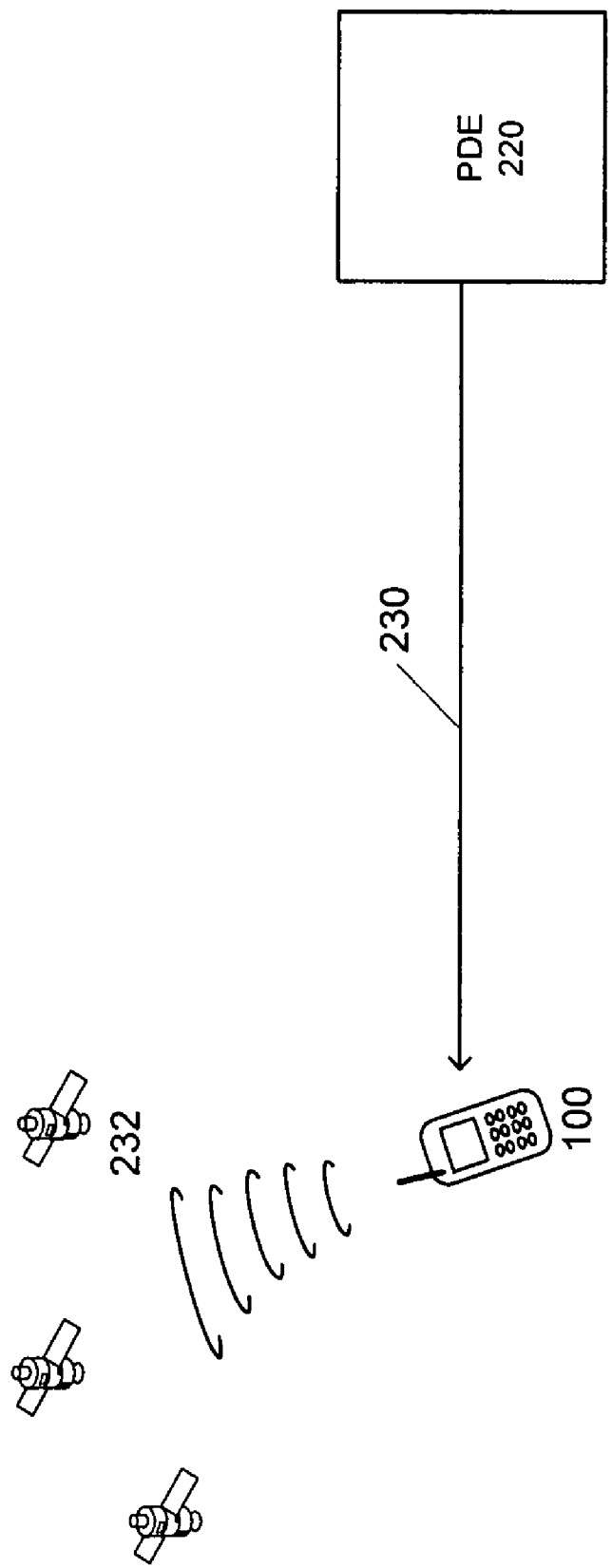
FIG. 6 is a flow diagram that illustrates MS-Based location determination logic, in accordance with an embodiment of the present invention.

In one embodiment of an MS-based method, as illustrated in FIG. 6, the mobile device 100 calculates the location information based on network-provided satellite almanac and Ephermis information. A PDE 220 sends the location 230 of satellites 232 to the mobile device 100 approximately every 12 hours (or other periodic interval). Using the received information, the device 100 searches for the satellites 232 on a periodic interval, and computes ranging and position locally. After the initial fix, the device 100 operates like an autonomous GPS receiver. When the satellite information is refreshed, at which time the device 100 sends a signal to the network to update the satellite information. MS-Based mode is appropriate for applications that require the device location to be updated rapidly, such as a navigation application.

One aspect of the invention involves accessing, controlling and maintaining the runtime environment in order to control certain processes. For example, one embodiment asserts control of a Java Virtual Machine runtime environment in order to carry out the sequential GPS location fixation process described above. The location-based API included in the standard Java environment (JSR-179) enables mobile location-based applications for resource limited devices. The API is designed to be a compact and generic API that produces information about the present geographic location of the terminal to Java applications, however it does not have the ability to control the methods of location fixes for sequential GPS location fixation. Therefore, the API must be altered in order to accommodate the sequential fixation locations carried out by the system using the techniques described herein.

Figure 7A:
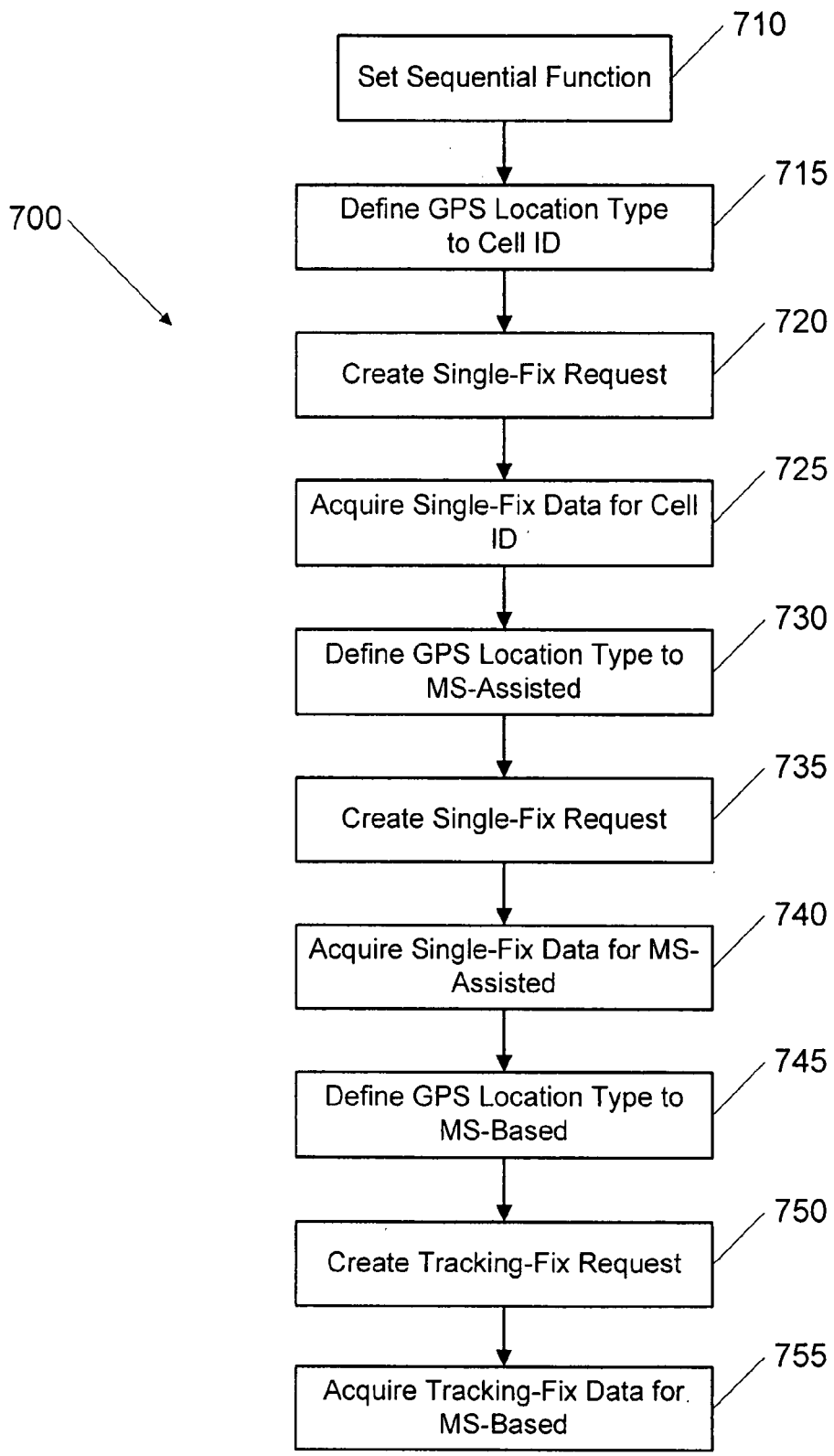
FIGS. 7A and 7B are flow diagrams that illustrate location determining process flows in accordance with an embodiment of the present invention.

Turning now to FIG. 7A, an exemplary process 700 of determining a location is shown. In one embodiment, mobile device extension supported GPS modes are implemented through an exemplary Java based approach. Upon initiation of a locating operation, a sequential function is set 710 to proceed iteratively, in one embodiment, through various GPS modes in order to determine a refined location. As such, for the first iteration the variable representing the GPS mode is defined 715 as a "Cell ID" mode. A single-fix request operation is initiated 720 in which the mobile device acquires location information 725 of the nearest cell tower through a Cell ID process as explained above. As mentioned above, the level of accuracy from the Cell ID operation is a high-level, city view or other less accurate initial location estimate.

A second iteration of a more precise GPS mode is advantageously used to more accurately identify the location. While the mobile device displays the city view map (or other geographic view) with the high-level location, a second single-fix operation is initiated by defining the GPS location type to "MS-Assist" 730. The single-fix operation is run 735 and the location data for the single-fix MS-Assisted is acquired 740 by the mobile device. As explained above, the result is a more accurate fix on the location of the mobile device. The second (and third) iterations of locating operations are masked to the user by the quick return time of the previous Cell ID operation and display.

In one embodiment, a third iteration may be initiated in order to track, or frequently update the location information. The GPS location type is defined as "MS-Based" 745 and an MS-Based operation, as explained above, is initiated 750. The mobile device then acquires tracking data on a periodic interval 755 from the satellites providing updated location information.

Figure 7B:
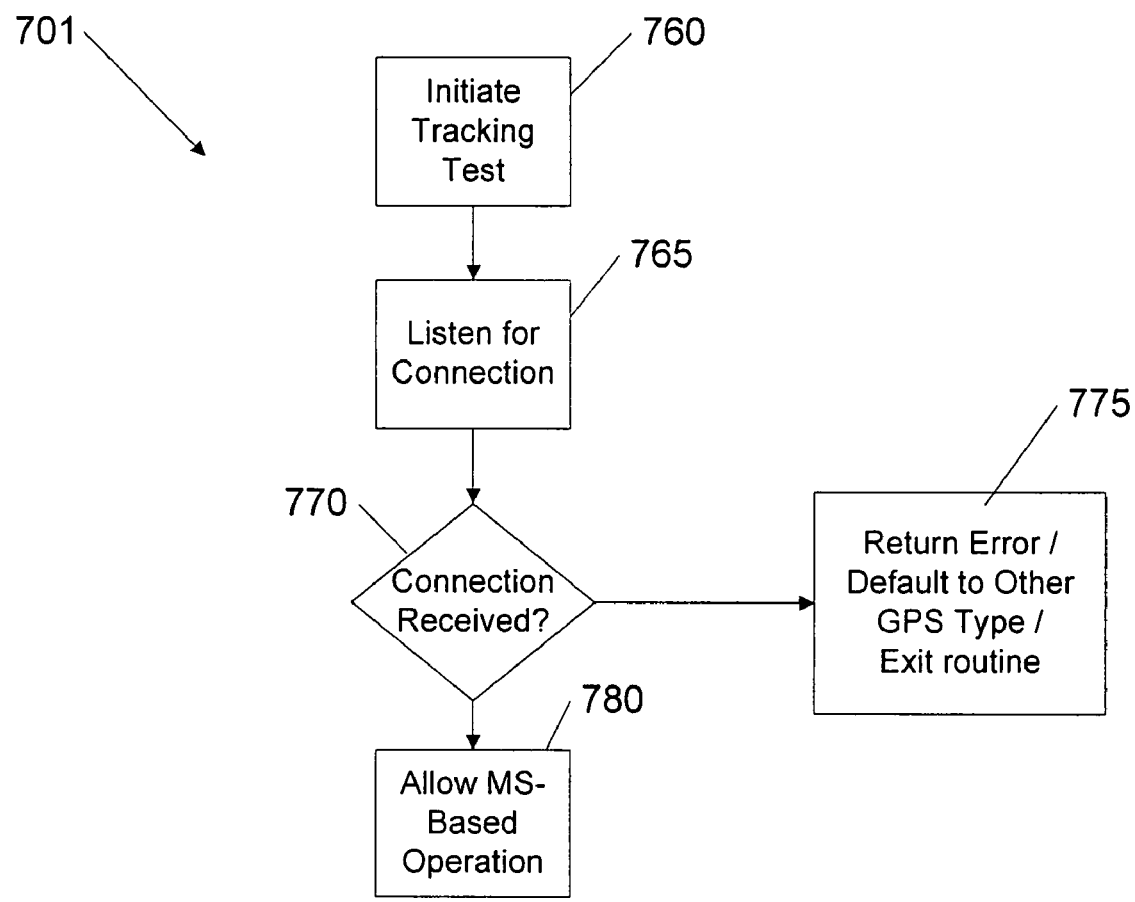

In one embodiment, the software executes a test sequence to determine whether an MS-Based operation can be successfully completed. If a mobile device cannot communicate directly with a satellite (i.e. the device is indoors or transmission is occluded by high rise buildings). In such an instance the embodiment of the invention may return an error code, default to another GPS mode or simply exit the process flow after the previous GPS mode data is acquired. A process flow for one embodiment of a test sequence 701 is shown in FIG. 7B. A tracking test is initiated 701 to determine the viability of an MS-Based operation. The device outputs a signal and listens for a response 765 from the satellites at the locations provided from the PDE. If a connection can be established with a satellite or other data source 770 an MS-Based operation will succeed and the device is allowed to initiate a tracking operation 780. If the connection cannot be received 770 from the source or satellite, the device may not be able to implement an MS-Based operation. In one embodiment, an error message may be returned to the user's display. Alternatively, the device may default to another GPS type, such as Cell ID or MS-Assist in order to provide at least a single-fix location determination, as described above.

Those of ordinary skill in the art will readily appreciate that mobile device 10 is exemplary only and that the present invention can operate within a number of different mobile devices. Furthermore, various embodiments of the present invention described above may be implemented at any level, ranging from hardware to application software and in any appropriate physical location or operating system.

Variations, modifications, and other implementations of what is described herein will occur to those of ordinary skill in the art without departing from the spirit and scope of the invention as claimed. Accordingly, the invention is to be defined not by the preceding illustrative description but instead by the spirit and scope of the following claims.

What is claimed is:

1. A computer-implemented method for determining the location of a mobile device, the method comprising the steps of:
    obtaining a first set of location data of the mobile device from a first source, the first set of location data indicating the location of the mobile device at a first level of granularity;
    obtaining, subsequent to obtaining the first set of location data, a second set of location data of the mobile device from a second source, the second set of location data indicating the location of the mobile device at a second level of granularity finer than the first set of location data;
    determining whether the mobile device can communicate directly with one or more satellites by executing a test sequence;
    obtaining, subsequent to obtaining the first set of location data, a series of location data based on signals received from the one or more satellites and satellite almanac and Ephemeris information about the one or more satellites received from a remote computer server, the series of location data continuously tracking a movement of the mobile device at a level of granularity finer than the first set of location data;
    displaying at least a part of the series of location data; and
    responsive to a determination that the mobile device cannot communicate directly with the one or more satellites, displaying the second set of location data instead of the at least a part of the series of location data.

2. The method of claim 1, further comprising:
    displaying the location of the mobile device as indicated by the first set of location data before the second set of location data becomes available.

3. The method of claim 1 wherein the first set of location data comprise cell tower location based information.

4. The method of claim 1 wherein the second set of location data comprise global positioning satellite based information.

5. The method of claim 1 wherein obtaining the second set of location data comprises:
    searching one or more cell towers and the one or more satellites using Global Positioning System (GPS) related information received from a second remote server;
    sending searched locations of the one or more cell towers and the one or more satellites to the second remote server; and
    receiving the second set of location data of the mobile device from the second remote server.

6. The method of claim 1, further comprising:
    displaying the first set of location data before the at least a part of the series of location data becomes available.

7. A mobile computing device, comprising:
    a computer-readable storage medium comprising executable computer program code for:
        obtaining a first set of location data of the mobile device from a first source, the first set of location data indicating the location of the mobile device at a first level of granularity;
        obtaining, subsequent to obtaining the first set of location data, a second set of location data of the mobile device from a second source, the second set of location data indicating the location of the mobile device at a second level of granularity finer than the first set of location data;
        determining whether the mobile device can communicate directly with one or more satellites by executing a test sequence;
        obtaining, subsequent to obtaining the first set of location data, a series of location data based on signals received from the one or more satellites and satellite almanac and Ephemeris information about the one or more satellites received from a remote computer server, the series of location data continuously tracking a movement of the mobile device at a level of granularity finer than the first set of location data;
        displaying at least a part of the series of location data and responsive to a determination that the mobile device cannot communicate directly with the one or more satellites, displaying the second set of location data instead of the at least a part of the series of location data.

8. The mobile computing device of claim 7, wherein the computer-readable storage medium comprising executable computer program code for:
displaying the location of the mobile device as indicated by the first set of location data before the second set of location data becomes available.

9. The mobile computing device of claim 7 wherein the first set of location data comprise cell tower location based information.

10. The mobile computing device of claim 7 wherein the second set of location data comprise global positioning satellite based information.

11. The mobile computing device of claim 7 wherein obtaining the second set of location data comprises:
searching one or more cell towers and the one or more satellites using Global Positioning System (GPS) related information received from a second remote server;
sending searched locations of the one or more cell towers and the one or more satellites to the second remote server; and
receiving the second set of location data of the mobile device from the second remote server.

12. The mobile computing device of claim 7, wherein the computer-readable storage medium comprising executable computer program code for:
displaying the first set of location data before the at least a part of the series of location data becomes available.

13. A non-transitory computer-readable storage medium encoded with executable computer program code for determining the location of a mobile device, the computer program code comprising program code for:
obtaining a first set of location data of the mobile device from a first source, the first set of location data indicating the location of the mobile device at a first level of granularity;
obtaining, subsequent to obtaining the first set of location data, a second set of location data of the mobile device from a second source, the second set of location data indicating the location of the mobile device at a second level of granularity finer than the first set of location data;
determining whether the mobile device can communicate directly with one or more satellites by executing a test sequence;
obtaining, subsequent to obtaining the first set of location data, a series of location data based on signals received from the one or more satellites and satellite almanac and Ephemeris information about the one or more satellites received from a remote computer server, the series of location data continuously tracking a movement of the mobile device at a level of granularity finer than the first set of location data;
displaying at least a part of the series of location data; and
responsive to a determination that the mobile device cannot communicate directly with the one or more satellites, displaying the second set of location data instead of the at least a part of a series of location data.

14. The non-transitory computer-readable storage medium of claim 13, wherein the computer-readable storage medium comprising executable computer program code for:
displaying the location of the mobile device as indicated by the first set of location data before the second set of location data becomes available.

15. The non-transitory computer-readable storage medium of claim 13 wherein the first set of location data comprise cell tower location based information.

16. The non-transitory computer-readable storage medium of claim 13 wherein the second set of location data comprise global positioning satellite based information.

17. The non-transitory computer-readable storage medium of claim 13 wherein obtaining the second set of location data comprises:
searching one or more cell towers and the one or more satellites using Global Positioning System (GPS) related information received from a second remote server;
sending searched locations of the one or more cell towers and the one or more satellites to the second remote server; and
receiving the second set of location data of the mobile device from the second remote server.

18. The non-transitory computer-readable storage medium of claim 13, wherein the computer-readable storage medium comprising executable computer program code for:
displaying the first set of location data before the at least a part of the series of location data becomes available.

* * * * *